United States Patent Office 2,985,637
Patented May 23, 1961

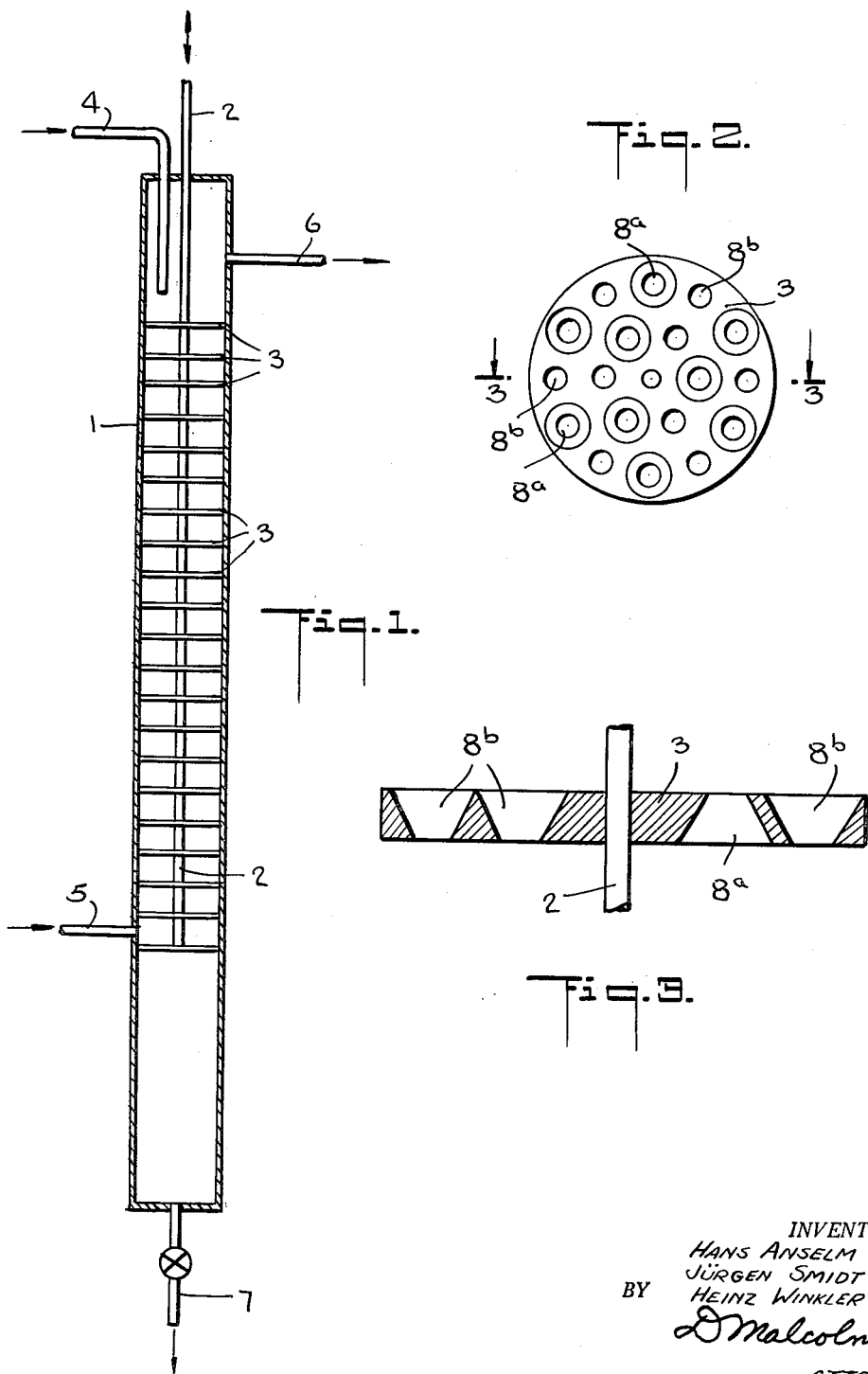

2,985,637

PROCESS FOR THE EXTRACTION OF CARBOXYLIC ACID FROM AQUEOUS SAPONIFICATION MIXTURES OF CARBOXYLIC ACID ESTERS OF POLYVINYL ALCOHOL

Hans Anselm, Grafelfing, near Munich, Heinz Winkler, Burghhausen, and Jürgen Smidt, Munich, Germany, assignors to Consortium für Elektrochemische Industrie G.m.b.H., Munich, Germany, a corporation of Germany Filed Jan. 22, 1957, Ser. No. 635,516
Claims priority, application Germany Sept. 10, 1955
5 Claims. (Cl. 260—91.3)

This invention relates to the extraction of carboxylic acid from aqueous saponification solutions of carboxylic acid esters of polyvinyl alcohol and has for its object to provide a novel and useful process for this purpose.

Another object of the invention is to produce pure aqueous solutions of polyvinyl alcohol from liquids obtained by saponification of polyvinyl acylates in the presence of water and acid catalysts. The term polyvinyl alcohol, being applied here in its technical sense, includes partially saponified, water-soluble products.

Other objects and advantages will be apparent as the nature of the invention is more fully disclosed.

This application is a continuation-in-part of our copending application Serial No. 542,194, filed October 24, 1955.

It is known to convert polyvinyl acetate into aqueous solutions of polyvinyl alcohol by heating the ester in the presence of water and acid saponification catalysts. These solutions, however, contain large amounts of acetic acid besides the acid catalyst and are not fit for practical use.

According to the prior art the separation of acetic acid is accomplished by mixing the saponification liquid with a low boiling alcohol, such as methanol, and distilling off the acetic acid ester which is formed. This procedure, however, results in the formation of an azeotropic mixture of methanol-methylacetate which is difficult to separate, and has the further disadvantage that the formed ester must be reconverted into acetic acid, needed for the production of vinyl acetate by a complicated process.

In our copending application Serial No. 542,194, we have described a process using liquid-liquid extraction for the continuous removal of carboxylic acid from saponification mixtures of polyvinyl acylates.

Means for carrying out such extraction include conventional extractors of the mixer-settler type. This type of extractor used for counter-current extraction of low viscous liquids has the disadvantage of a limited output when working with highly viscous solutions of polyvinyl alcohol. The flow-rate is decreased because high viscous liquids show reduced tendency to separate by the action of gravity.

Other types of extractors use a pulsing action to force liquids in counter-current through an extraction zone. According to commonly accepted views (Chemical Engineering, p. 188, 1954) these extractors can be operated with systems easily emulsified only under conditions of slight turbulence. In these instances little improvement in extraction efficiency is to be expected.

We have now discovered to our surprise that the extraction of carboxylic acid from aqueous solutions containing polyvinyl alcohol may be achieved with particularly good results and high output by applying conditions of high turbulence. In spite of the known emulsifying action of polyvinyl alcohol the best extraction effect is obtained using high frequencies and low amplitudes, conditions otherwise known to be very effective in producing stable and hence difficultly separate emulsions.

According to a preferred method of carrying out the present invention the liquids are conducted through a vessel the liquid content of which is set in vibration primarily by means of a number of multi-apertured media such as perforated plates oscillating with great speed in a vertical direction, as hereinafter more fully explained. The interadjacent space between these perforated plates and the vessel wall is very small, so that the counterflowing liquids are compelled to make their way through the openings of the plates. The best extraction effect is obtained with a high oscillation number of about 50–100 per second and a low oscillation width of about 0.3–3 mm. The optimum conditions being dependent on many factors such as the viscosity of the polyvinyl alcohol solution and the kind of extraction medum used, it is to be understood that the above specified conditions are merely given for purposes of illustration and do not exclude the use of other frequencies and amplitudes in the same order of magnitude. The plates which to a certain extent correspond to the floors of a distillation column should be of such number as to permit an extraction effect of at least 96% with an economic quantity of the extraction medium.

Suitable extraction media comprise liquids which readily dissolve the acetic acid, but practically do not dissolve the polyvinyl alcohol, and which furthermore do not suffer any disturbing changes under the influence of the saponification catalyst and increased temperature, or react with the polyvinyl alcohol. The following extraction media are particularly suitable: ethers, such as isopropyl ether, ketones, such as 2-butanone, 2-pentanone, methylisobutyl-ketone and isophorone, as well as esters which are difficult to saponify, such as tributyl phosphate, alone or in combination.

With the use of these extraction media in general 20 to 30 plates appear to be sufficient. In order to get a good extraction effect and a high throughput such factors as diameter of perforations, total free passage, and viscosity of saponificatien liquid must be brought into a favorable relationship. If the perforations are too small, the highly viscous solution does not pass them even if the total free passage is large; if they are too large, the passage or throughput is good but extraction effect becomes poor.

There are several ways of adjusting diameter and number of perforations to the viscosity of the polyvinyl alcohol solutions. For instance, it is possible to start with small perforations which are then progressively widened until optimum conditions as determined by measurement of throughput and extraction effect are found. We prefer to use perforations of medium diameter, say about 6–7 mm. in such number that the total free passage amounts to 40–50%. The viscosity of the polyvinyl alcohol solution is then adjusted by selecting a suitable extraction temperature in the range of 20° C. to about 90° C.

Another method of carrying out the invention uses an apparatus where the perforated plates are connected closely with the wall of the extraction vessel and the liquid is set into vibration by an oscillating membrane or the piston strokes of a pump. Since the extraction process is effected by the relative movement of liquid and plates it does not matter whether this movement is brought about through oscillating plates or through an oscillating liquid.

The elimination of the catalyst present in the saponification mixture for determining the desired degree of saponification prior to the extraction is effected, in case solid catalysts are used, in a mechanical way, and in the case of dissolved acid catalysts for instance by completely neutralizing an acid acting as catalyst or an acid salt without affecting any considerable amount of carboxylic acid. In the case of sulfuric acid as the catalyst and acetic acid as the carboxylic acid neutralization up to a pH value of say 2.0 to 2.5 has the effect that the sulfuric acid is neutralized whereas practically no neutralization takes place with the acetic acid, and that the saponification does not proceed even after the extraction of the acetic acid and after the addition of water.

If the clear extract which was obtained for instance by extracting acetic acid by means of a mixture of 82 vol. acetic acid ethyl ester and 18 vol. of benzene is continuously fractionated one obtains a two-phase distillate containing practically all the water of the extract, but only a very small amount of acetic acid and which, after removing the aqueous phase, may directly return to extraction. The acetic acid is 98 to 99% and contains a small amount of extracting agent, but no polyvinyl alcohol. For some purposes it may be used directly; for the preparation of vinyl acetate it is distilled once again.

The following examples are given for purposes of illustration only and are not intended to constitute any limitation on carrying out the process of the invention in accordance with the principles outlined above.

The invention is described in the examples in connection with the accompanying drawing, in which:

Fig. 1 is a vertical sectional view of an extraction apparatus suitable for carrying out the process of the invention;

Fig. 2 is a plan view of one of the vibratable plates of Fig. 1; and

Fig. 3 is a transverse section taken on line 3—3 of Fig. 2.

*Example 1*

An extraction apparatus according to Fig. 1 of the drawing includes a vertical pipe 1 which may be heated and cooled, having a height of 1.2 m., and 48 mm. clear width, in which pipe there is an axial insert or rod 2 set in fast vertical motion by means of any suitable driving member (not shown) with an oscillation or vibration number or rate of 50 per second and an oscillation width or range of 2.7 mm. To this insert there are attached twenty-one round plates 3 of 2.0 mm. thickness and of 46.4 mm. diameter at mutual distances of 20 mm. each. Each of these plates (Fig. 2) has eighteen round holes 8a and 8b of 6.4 mm. clear width which are widened alternatively on one side or the other until they reach a width of 13 mm. (Fig. 3).

The saponification liquid was obtained by heating a dispersion of 300 grams polyvinyl acetate in 700 grams water stabilized with 10 grams polyvinyl alcohol for 8 hours to 80° C. after addition of 9 grams perchloric acid and 3 grams hydrochloric acid. The viscosity of the resulting liquid (measured with the consistometer) was at 60° C. $\eta=6,840$, at 20° C. $\eta=$ exactly 35,000 cp. The extraction of the acetic acid was effected at 60° with an extraction medium which consisted of 66% butanone, 31% benzol and 3% water.

Through supply line 4, at the rate of 1.8 kg. per hour, saponification liquid heated to 60° C. flowed into the pipe enclosure from above between discs 19 and 20. Through supply line 5 the extraction medium entered, likewise heated to 60° C., in the quantity of 2.5 liters per hour between the first and second discs from the bottom. The extract gathered as layer above the top disc and was discharged through outlet 6. The refined product was drawn off at outlet 7.

The refined product contained 0.3% acetic acid immediately after extraction. 96.7% of the acetic acid contained in the saponification liquid was in the extract. With heating for a short time to about 90° C. the acetic acid rose in the refined product about 1.8%, whereby the saponification degree of the polyvinyl acetate increased to more than 99%. Through repeated extraction in the same way the aggregate output of the acetic acid in the extract rose to 96% theory.

For the purpose of removing the small quantities of acetic acid and the perchloric and hydrochloric acids used as catalysts the refined product of the previous extraction was extracted with n-butanol at 60° C., whereby the extraction apparatus received about 1.53 kg. per hour of refined product or raffinate and below 3.8 liters per hour. After driving off the dissolved butanol with a moderate vacuum there remained about 25% pure polyvinyl alcohol solution.

*Example 2*

The extraction apparatus corresponded to that described in Example 1; the frequency of vibration amounted to 100 per second, the width or range of oscillation was 1 mm. To be extracted was a saponification liquid which had been obtained from a 22.6% dispersion of polyvinyl acetate with 1.2% polyvinyl alcohol as emulsifier and 1.2% of a mixture of perchloric acid and hydrochloric acid in the ratio of 3:1 as saponification catalyst through heating to 110° C. It contained 14.6% acetic acid corresponding to a 94% saponification, and at 60° C. had a viscosity of $\eta=1,053$ cp. After the extraction of the acetic acid at 60° C. according to Example 1, the raffinate still contained 0.6% acetic acid, corresponding to an extraction effect of 94.6%.

If instead of the plates used in Example 1, with a hole width of 6.4 mm., the same aggregate number of plates is used of which, however, the top half has holes with a clear width of 2.3 mm. and the lower half holes with a clear width of 3.9 mm., the extraction effect increases to 97% of the acetic acid present. The extraction effect improves similarly with the use of plates with 6.4 mm. holes, when the temperature is not 60° C. but 42° C., in which process the saponification liquid had a viscosity of $\eta=7,000$ cp.

*Example 3*

The saponification is carried out in a pressure vessel equipped with a stirrer and a jacket heater.

Introduced are 5 kg. polyvinyl acetate=58.1 mols vinyl acetate in pearl form having a K value of 53 and 2.93 kg.=162.7 mols water in which 40 g. sulfuric acid and 4 g. butylnaphthalene sulfonic acid have been dissolved. The mixture is heated under stirring to 110° C. and from about the sixth hour on, a sample of the vessel content which has meanwhile become homogenous is taken each hour and is examined with regard to the acetic acid formed and the unsaponified portion. Analysis shows that the saponification does not proceed after the sixth hour and that it is stopped at a saponification degree of 75%.

The vessel is cooled to about 90° C. and during the period of about one hour 4850 g. water in which 40 g. NaOH are dissolved are added under stirring. Through this addition the pH value of the saponification liquid increases from 1.1 to 2.3, thereby sufficiently inactivating the acid catalyst, whereas practically no acetic acid is neutralized.

The viscous saponification liquid (viscosity at 60° C.=3160 cp.) is subjected at 60° C. to the above-described continuous counter-current extraction by a mixture of 82 parts by vol. acetic acid ethyl ester and 18 parts by vol. of benzene. The apparatus used therefore consists substantially of a pipe of 1.2 m. length and 4.8 cm. width which may be heated and in which thirty plates having a diameter of 4.6 cm. and containing eighteen holes of 6.4mm. width are fixed to a central rod. The rod with its plates is driven by a suitable motor and with a oscillating width of 1 mm. makes 90 oscillations per second. With an extraction ratio of 2.5 vol. extracting medium:1 vol. saponification liquid, 99.2% acetic acid formed by saponification are transferred from said liquid into the extract.

By distillation of the extract in a throughpass column one recovers at B.P. 68–69° C. the solvent together with some water free of acetic acid, whereas the acetic acid which is nearly free of water and solvent is discharged from the still and by effluxing is obtained in completely pure form.

From the extracted polyvinyl alcohol solution the extraction medium which has been dissolved is removed by distillation, and there is obtained a 28% aqueous solution of polyvinyl alcohol with 25 mol percent acetyl groups, said solution containing only a small amount of acetic acid and sodium sulfate. It is excellently suited for being used in emulsifying, dispersing and stabilizing processes.

Example 4

The saponification vessel consists of a U-pipe of 6 cm. width which can be heated and has legs of 1 m. length, one of which is filled with distributing bodies whose size increases in the direction from above to below.

A dispersion of 49.3% polyvinyl acetate with a K value of 55 in water, corresponding to a ratio of 5.1 mols water per mol of vinyl acetate, is subjected to continuous extraction. The dispersion contains 0.5% of perchloric acid as the saponification catalyst. The mixture enters the U-pipe which is heated to 96–98° at the upper end of the leg filled with the distributing bodies and leaves the pipe after saponification at the upper end of the other leg. At an introducing rate of 280 g. per hour the mixture remains in the saponification vessel about 16 hours. During this time saponification proceeds until it comes to a standstill, and there is obtained a 28% aqueous acetic acid solution of polyvinyl alcohol containing 15 mol percent acetyl groups, corresponding to a 85% saponification of the polyvinyl acetate employed.

Before extracting the acetic acid formed during saponification, 4 parts of the saponification liquid are mixed with 3 parts of water in which 0.65 part of sodium hydroxide have been dissolved, whereby the perchloric acid is neutralized.

Extraction of the acetic acid from the highly viscous saponification liquid, further treatment of the extract and recovering of the pure acetic acid proceed according to the description given in Example 3.

After distilling off the dissolved extraction medium one obtains an approximately 20% aqueous solution of polyvinyl alcohol having 15 mol percent acetyl groups which is well suited as an emulsifying agent in emulsion polymerization processes.

The invention claimed is:

1. Process for the liquid-liquid extraction of carboxylic acid from an aqueous saponification solution of carboxylic acid esters of polyvinyl alcohol, which comprises passing said solution in counter-current flow to a non-aqueous extraction liquid which is a solvent for said acid and is immiscible with said solution and whch is more volatile than the least volatile component of said solution through multi-apertured media in an extraction zone, and exerting relative vibratory movement between said solution and said liquid to create high turbulence in said zone, said liquid being selected from the group consisting of isopropyl ether, 2-butanone, 2-pentanone, methylisobutyl-ketone, isophorone, and tributyl phosphate.

2. Process according to claim 1, where the vibratory movement has an oscillating frequency of about 50–100 oscillations per second and an oscillating width of about 0.3–3 mm.

3. Process according to claim 1, where the extraction is carried out at temperatures in the range from 20° C. to about 90° C.

4. Process according to claim 1, wherein the saponification catalyst in the saponification mixture is inactivated prior to the extraction.

5. Process according to claim 1, in which the extraction medium is recovered from the extract in pure form by fractionating.

References Cited in the file of this patent

UNITED STATES PATENTS

| | | |
|---|---|---|
| 2,407,820 | Durrum | Sept. 17, 1946 |
| 2,583,991 | Blume | Jan. 29, 1952 |
| 2,609,277 | McNamara | Sept. 2, 1952 |
| 2,642,420 | Kenyon et al. | June 16, 1953 |
| 2,662,001 | Burns et al. | Dec. 8, 1953 |
| 2,667,407 | Fenske et al. | Jan. 26, 1954 |
| 2,668,810 | Bergmeister | Feb. 9, 1954 |

OTHER REFERENCES

Sege et al.; Chemical Engineering Progress, vol. 50, No. 8 (August 1954), pp. 396–402 (p. 402 only needed).

Weigandt et al.; Chemical Engineering, vol. 61 (July 1954), pp. 183–188 (p. 184 only needed).